United States Patent [19]

Lin

[11] Patent Number: 5,389,980
[45] Date of Patent: Feb. 14, 1995

[54] NOSE PADS FOR SPECTACLES

[76] Inventor: Nan-Chieh Lin, No. 71, Lane 160, Sec. 4, Chang Ho Street, Tainan, Taiwan, Prov. of China

[21] Appl. No.: 176,254

[22] Filed: Jan. 3, 1994

[51] Int. Cl.6 ............................................. G02C 5/12
[52] U.S. Cl. .................................... 351/139; 351/136
[58] Field of Search ............... 351/131, 132, 139, 136, 351/137, 138, 65, 78, 79, 80, 81

[56] References Cited

U.S. PATENT DOCUMENTS

| | | | |
|---|---|---|---|
| 3,043,191 | 7/1962 | Lanski | 351/136 |
| 3,515,467 | 6/1970 | Stewart | 351/137 |
| 5,291,230 | 3/1994 | Bradley | 351/137 |

*Primary Examiner*—William L. Sikes
*Assistant Examiner*—Hung Xuan Dang
*Attorney, Agent, or Firm*—Morton J. Rosenberg; David I. Klein

[57] ABSTRACT

A nose pad for spectacles has two nose pad bodies pivotally connected with a lens frame, two soft plastic covers for attaching separably the nose pad bodies therein, and an elastic bridge provided to connect the two covers. The covers and the bridge keep the whole spectacles in secured condition without possibility of sliding down the face of a user.

1 Claim, 2 Drawing Sheets

NOSE PADS FOR SPECTACLES

BACKGROUND OF THE INVENTION

A common conventional spectacles may often slide down a face in wearing when the face of a user perspires, permitting the focus point of the lenses to alter, giving influence to eye sight of a user and deteriorate it gradually.

SUMMARY OF THE INVENTION

This invention has been devised to offer a nose pad for spectacles, possible to secure the position of spectacles on a face of a user, not easily to slid down the face of a user, even if the face perspires.

A nose pad for spectacles in the present invention comprises two nose pad bodies fitted in two oval covers made of soft plastic to contact on the nose of a user, and a soft plastic bridge provided to connect upper portions of the covers to rest on the nose, forming three points to contact on the nose for securing the position of the spectacle, preventing it from sliding down and to let the nose to feel comfortable.

BRIEF DESCRIPTION OF DRAWINGS

The invention will be better understood by reference to the accompanying drawings, wherein.

DESCRIPTION OF THE PREFERRED EMBODIMENTS

Figure 1:
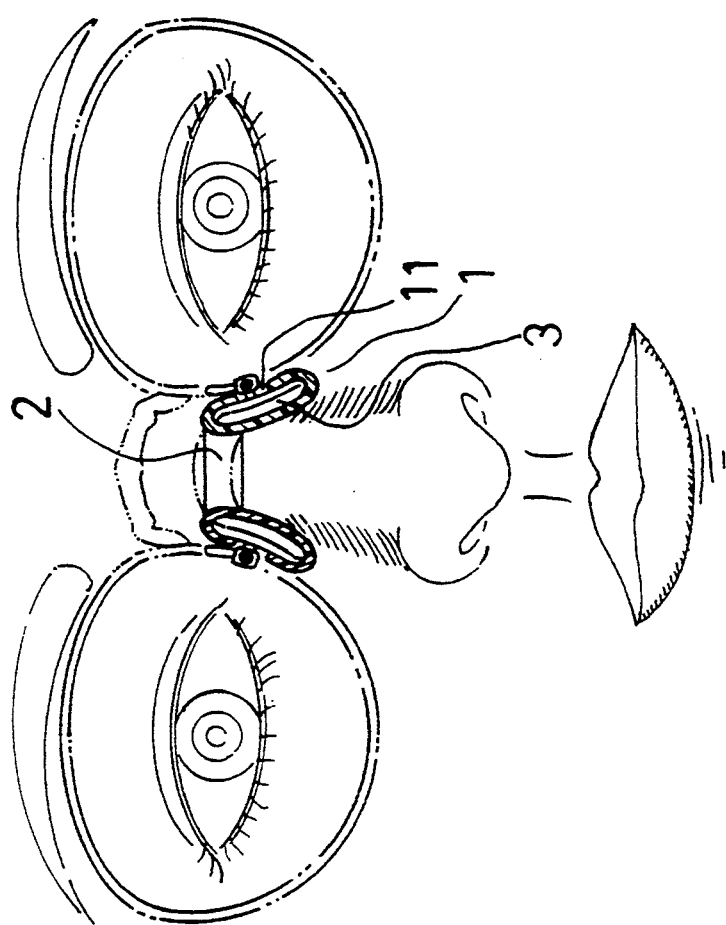
FIG. 1 is a front view of a nose pad for spectacles in the present invention; and, FIG. 2 is a side view of a nose pad for spectacles in the present invention.
Figure 2:
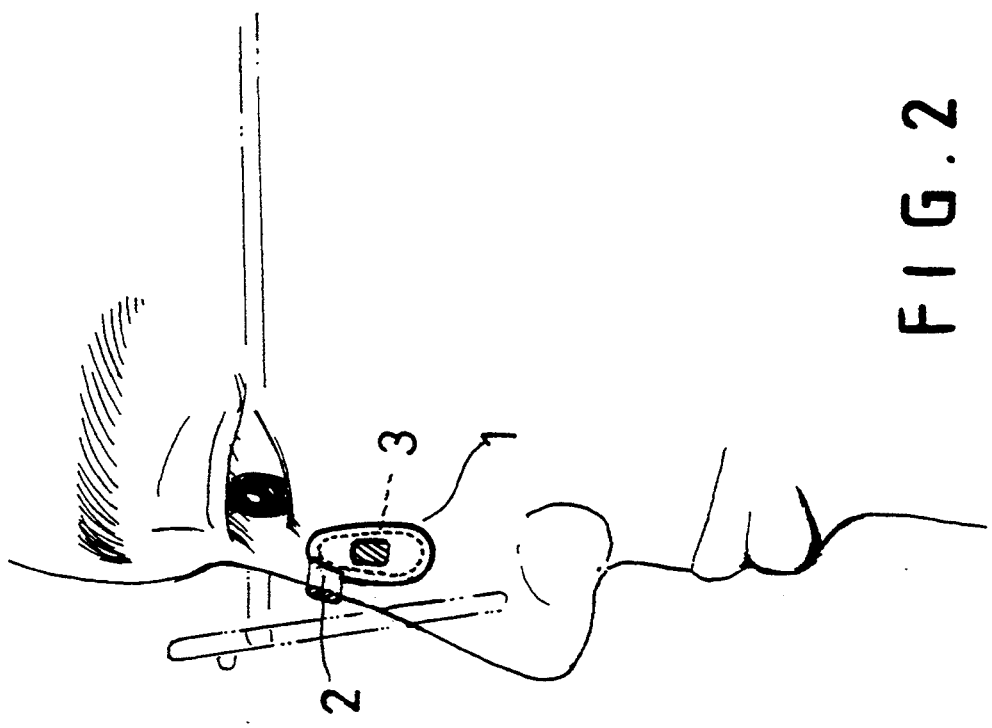

A nose pad for spectacles in the present invention, as shown in FIG. 1, includes two nose pad bodies 3 pivotally connected with a lens frame, two long oval covers 1, 1 wrapping the two nose pad bodies 3 and having an aperture 11 in an outer side, and an elastic bridge 2 connecting upper ends of the two oval covers 1, 1.

In assembling, the apertures 11, 11 of the two long oval covers 1, 1 are expanded manually for the two nose pad bodies 3, 3 to slip therethrough to fit in the long oval covers 1, 1. Then spectacles equipped with the nose pad of this invention have three points, namely, the elastic bridge 2 and two nose pad bodies 3, 3 to closely contact an upper surface of the face of a user to support the spectacles stably, and firmly, not permitting the whole spectacles to slide down when the face perspires. And besides, a user's nose will feel more comfortable because of three points for supporting the whole spectacles instead of two points of conventional spectacles.

As can be seen from the above description, this invention has the following advantages.

1. The elastic soft long oval covers 1, 1 give comfortable feeling to the user's nose because of softness.
2. As the spectacles are supported by three points, which scatters the weight of the spectacles, giving comfortableness to the user's nose.
3. The bridge made of elastic material can give stability to stay on the nose of a user, securing the position of the spectacles on the nose of a user together with the two nose pad bodies, so the spectacles might not slide down even if the nose should perspire, keeping the focus point of the lenses accurately.
4. The elastic bridge pulls the two pad bodies pivotally connected with the lens frame to permit them positioned in a definite sloped angle, and let the frame positioned at a definite height for the eyes of a user.
5. The oval covers is detachably combined with the nose pad bodies, easy and quick to replace or assemble.
6. The nose pad bodies can be formed by means of injecting process, extremely simple to manufacture, to a resultant cheap cost.

While the preferred embodiments of the invention have been described above, it Will be recognized and understood that various modifications may be made therein and the appended claims are intended to cover all such modifications which may fall within the spirit and scope of the invention.

What is claimed is:

1. A nose pad attachment system for a pair of nose pad bodies pivotally coupled to a lens frame comprising:
   (a) a pair of ovally contoured cover members, each of said cover members enclosing a respective one of said nose pad bodies and having an aperture formed through an outer wall of each of said cover members for insert therein of said nose pad body, each of said cover members formed of a flexible plastic composition; and,
   (b) an elastic bridge member having opposing ends secured respectively to an upper section of each of said cover members, said elastic bridge and said cover members in contiguous interface with the nose of a user to prevent displacement of said lens frame when worn by said user.

* * * * *